Aug. 3, 1926.  
F. H. SLEEPER  
GEAR SHIFT  
Filed Nov. 12, 1924  
1,594,571
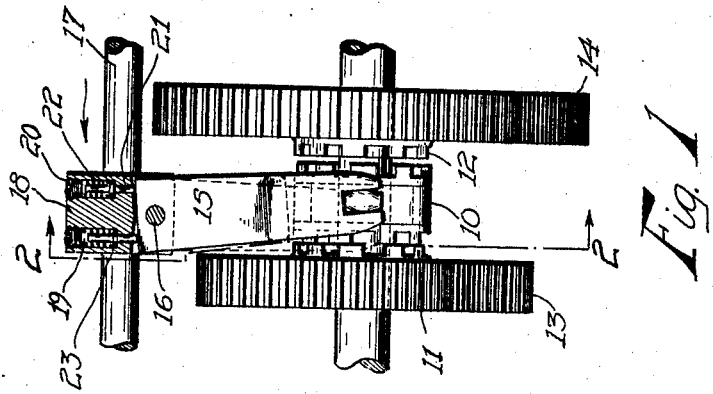
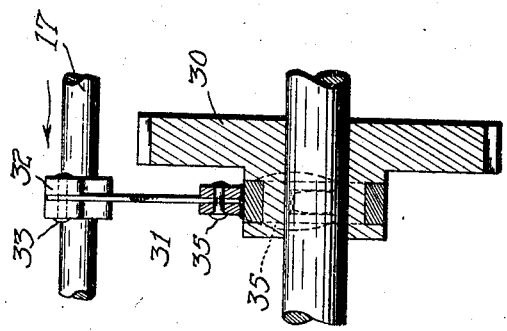
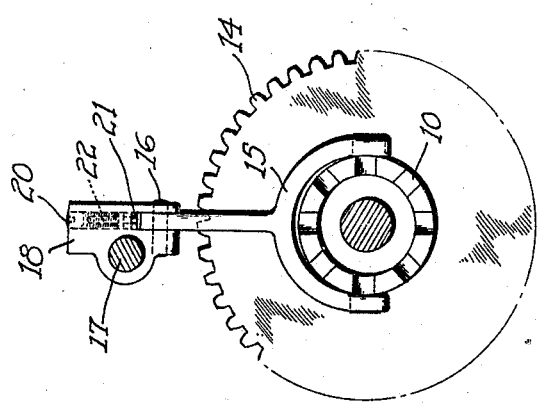
Inventor  
Frank H. Sleeper  
By Attorneys Patented Aug. 3, 1926.

1,594,571

UNITED STATES PATENT OFFICE.

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

GEAR SHIFT.

Application filed November 12, 1924. Serial No. 749,436.

This invention relates to a shifting device for connecting gears or clutches of automobiles or other machinery. The principal object of the invention is to provide a gear shift which can be set over by hand as far as it is intended for it to go and which will have a yielding connection so that it will be pressed yieldingly into position just as soon as the gears mesh or the clutch teeth come into registration by rotation of one of the parts. By this arrangement the shifting of the gears is rendered practically noiseless and the device will take care of wide range of speeds.

Reference is to be had to the accompanying drawings in which

Fig. 1 is a side view of a gear shift constructed in accordance with this invention and partly in section;

Fig. 2 is a sectional view of the same on the line 2—2 of Fig. 1; and

Fig. 3 is a central longitudinal sectional view of a modification.

In Figs. 1 and 2, I have shown the invention as applied to a clutch collar 10 for connecting two clutch sections 11 and 12 on two gears 13 and 14 respectively. Of course instead of gears the elements 13 or 14 both might be pulleys or any other rotary elements. The parts so far described are of the usual construction. The clutch collar is operated by a yoke 15 which is pivoted on a stud 16 carried by a block 18 on the shift rod 17. The block 18 has two cylindrical cavities 19, each closed at the top by a screw plug 20. Each one is provided with a plunger 21 pressed by a spring 22 so that a disc or piston 23 on the plunger is normally forced down to the bottom of the cavity. The lower end of the plunger projects down through a perforation centrally disposed with respect to the cavity. I have shown two of these plungers, each one being pressed by its spring against the top of the yoke 15 on the opposite sides of the pivot 16. The result of this is that if the yoke is turned away from the neutral position, one of the springs will tend to force it back. When in neutral position the springs will co-operate to hold it there with yielding pressure. The motion of the plungers is limited.

In the operation of the device, the shift rod 17 is moved to the right or left. It will be understood that in the ordinary gear shift, the rod is locked in its extreme position. In Fig. 1 I have shown it pushed to the left and it will be seen that the clutch collar 10, not coming into mesh immediately, holds back and the right hand spring tends to force it over to the left. Therefore, just as soon as the gear 13 and the clutch collar 10 have turned relatively to such position that the clutch teeth come into mesh, the clutch will move over due to the spring. When the clutch rod is shifted in either direction the spring holds the clutch collar yieldingly against the series of clutch teeth which are to be engaged. Then it immediately slides into clutching relation by the action of the spring and without further attention on the part of the operator.

In the form shown in Fig. 3, a gear 30 is adapted to be shifted by the clutch rod 17. It is shown in the neutral position, but when the clutch rod moves to the right or left, a spring 31, connected with the block 32, carried by the clutch rod, will be flexed out of position. The strength of the spring will be constantly exerted to make the shift in the right direction as soon as the gear teeth mesh. In this case, the spring 31 is connected with the block 32 by stud 33 and with the yoke 34 by stud 35. The gear of course has the usual grooved collar or shoulder for receiving the yoke.

In either case, the operator merely operates the shift lever to its full extent no matter whether the gears come into mesh immediately or not and thereafter he has nothing further to do. The spring causes the parts to connect when they come into registration. On the final motion they move only the distance equal to the height of the clutch teeth and therefore there is no opportunity for the operator to shift more rapidly or with more noise at one time than another. That action is really beyond his control. All he does is to move the clutch rod and the spring performs the clutching operation in an easy and practically noiseless manner.

Although I have illustrated and described only two forms of the invention, I am aware of the fact that other modifications can be made by persons skilled in the art without departing from the scope of the invention as expressed in the claims. Therefore I do not wish to be limited to all the details of construction herein shown and described, but what I do claim is:—

1. In a device of the character described, the combination with a shift rod, a shaft and a clutch element movable on said shaft to connect either one of a pair of gears thereto, a yoke connected to said rod by a transverse pivot and engaging said clutch element, a pair of springs carried by said rod, and plungers acted upon by said springs and engaging said yoke on opposite sides of its pivot, whereby longitudinal shifting of said rod compresses one of said springs which, in expanding, swings said yoke and moves said clutch member into engagement with one of said gears.

2. In a change-speed transmission, a clutch element and yielding means to shift the same, said means comprising a shift rod, a block fast thereon and carrying a pivot at right angles to said rod, a yoke mounted to swing on said pivot and engaging said clutch element at its free end, and a spring in said block on each side of said pivot, said springs acting on the top of said yoke to either hold it and said clutch member in neutral position or to move them in one direction or the other as said shift rod is moved.

3. In a device of the character described, the combination with a shift rod and a block fixed thereon, of a pair of plungers carried by the block, springs in the block pressing the plungers forwardly to a limited extent, a yoke pivoted to the block on a transverse axis between the plungers in position for the plungers to bear on it on opposite sides of the pivot, and a clutch collar in position to be actuated by the yoke.

In testimony whereof I have hereunto affixed my signature.

FRANK H. SLEEPER.